United States Patent [19]
Conochie et al.

[11] Patent Number: 5,640,708
[45] Date of Patent: *Jun. 17, 1997

[54] TREATMENT OF WASTE

[75] Inventors: David Stewart Conochie, Hawthorn East; Robin John Batterham, Sandringham; Terry Alan Matthews, Wheelers Hill, all of Australia

[73] Assignee: Technological Resources Pty. Limited, Melbourne, Australia

[*] Notice: The term of this patent shall not extend beyond the expiration date of Pat. No. 5,396,850.

[21] Appl. No.: 360,732

[22] PCT Filed: Jun. 29, 1993

[86] PCT No.: PCT/AU93/00317

§ 371 Date: Jan. 27, 1995

§ 102(e) Date: Jan. 27, 1995

[87] PCT Pub. No.: WO94/00533

PCT Pub. Date: Jan. 6, 1994

[30] Foreign Application Priority Data

Jun. 29, 1992 [AU] Australia .................. PL 3215

[51] Int. Cl.[6] ....................................... A02N 3/00
[52] U.S. Cl. .................. 588/201; 588/205; 588/236; 423/DIG. 12
[58] Field of Search ................... 588/201, 900, 588/205, 236; 423/DIG. 12, DIG. 18

[56] References Cited

U.S. PATENT DOCUMENTS

| | | | |
|---|---|---|---|
| 5,191,154 | 3/1993 | Nagel | 588/201 |
| 5,322,547 | 6/1994 | Nagel | 588/201 |
| 5,354,940 | 10/1994 | Nagel | 588/201 |
| 5,396,850 | 3/1995 | Conochie et al. | 588/201 |

FOREIGN PATENT DOCUMENTS

| | | |
|---|---|---|
| 34876/68 | 3/1969 | Australia . |
| 72996/74 | 9/1974 | Australia . |
| 36 08 005 | 3/1986 | Germany . |
| 39 06 869 | 3/1989 | Germany . |

OTHER PUBLICATIONS

International Search Report for International Application No. PCT/AU 93/00317.

*Primary Examiner*—Gary P. Straub
*Attorney, Agent, or Firm*—Merchant, Gould, Smith, Edell, Welter & Schmidt, P.A.

[57] ABSTRACT

A method of treating inorganic solid waste in a bath of molten metal contained in a vessel (3) which has a space above the bath and a waste gas outlet (11) is disclosed. The method comprises injecting waste into the bath to form a primary reaction zone (13) in which there are reactions between the waste and the bath or in which the waste undergoes a change of phase to convert the waste into more readily recoverable or disposable products. The method further comprises injecting oxygen-containing gas towards the surface of the bath to form a secondary reaction zone (17) in a section above the bath through which oxidisable products released from the primary reaction zone (13) flow to reach the waste gas outlet (11) in the vessel (3) and in which the oxidisable products are oxidised and the heat released by such oxidation is transferred into the bath.

13 Claims, 1 Drawing Sheet

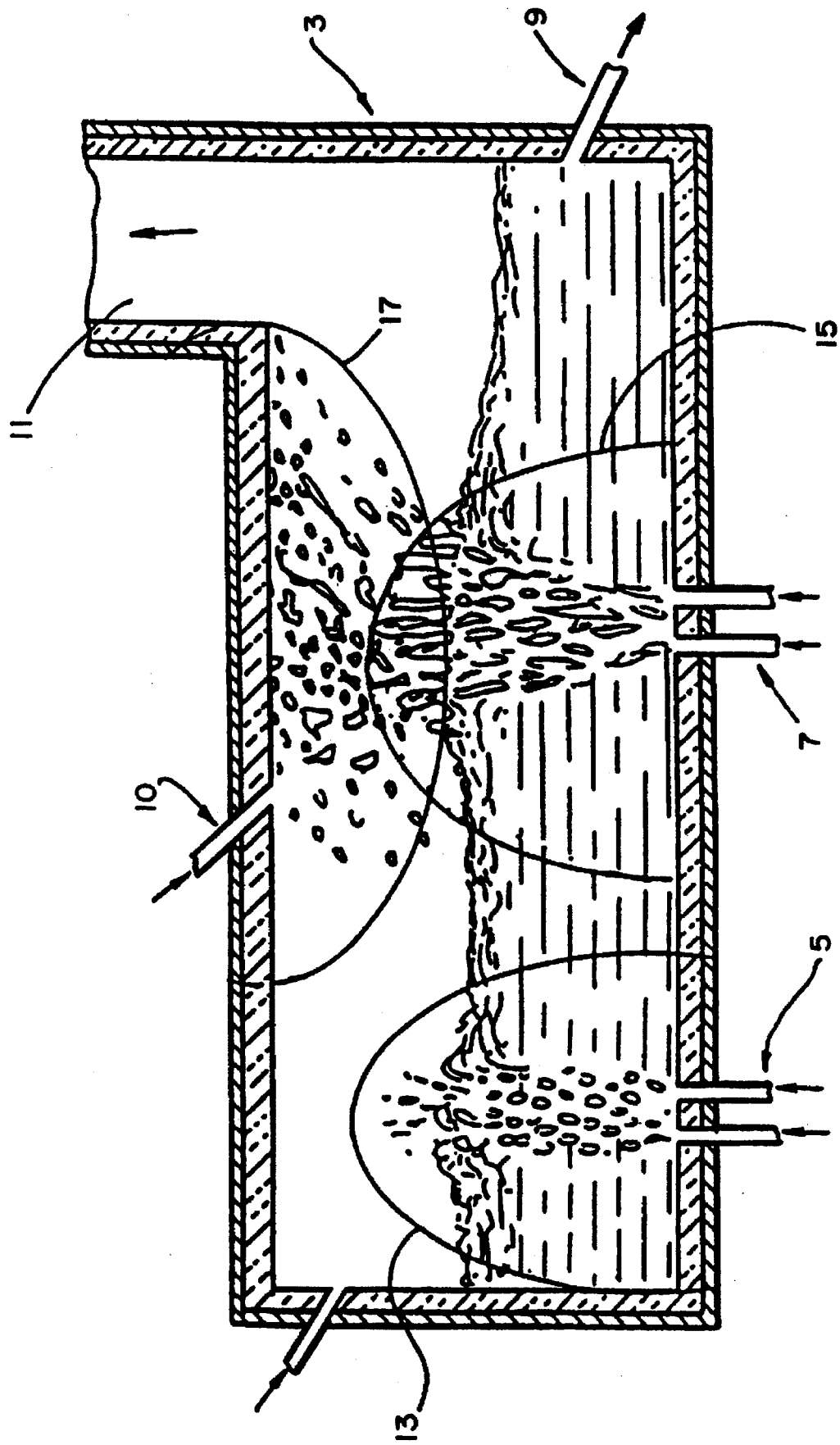

TREATMENT OF WASTE

The present invention relates to the treatment of inorganic solid waste.

In particular, the present invention relates to the treatment of inorganic solid waste which is commonly referred to as "dusts".

The term "dusts" as used herein is understood to mean any relatively finely divided particulate material and includes but is not limited to:

(a) metallic or metallic oxide containing material substantially collected by gas cleaning systems operated, for example, as a component of pyro-metallurgical production and processing; and/or (b) inorganic residues arising from the combination or incineration of toxic, hazardous and non-hazardous wastes, including fly ash, bottom ash and particulate material collected by gas cleaning systems.

In many instances, for a range of environmental and materials handling reasons it is difficult and expensive to dispose of dusts. For example, dusts often contain hazardous compounds and require particular processing before disposal. In addition, dusts often contain components which, whilst valuable, cannot be recovered economically.

It is an object of the present invention to provide a method of treating dusts which alleviates the disadvantages described in the preceding paragraphs.

According to the present invention there is provided a method of treating inorganic solid waste in a bath of molten metal contained in a vessel which has a space above the bath and a waste gas outlet, the method comprising:

(a) injecting waste into the bath to form a primary reaction zone in which there are reactions between the waste and the bath or in which the waste undergoes a change of phase to convert the waste into more readily recoverable or disposable products; and (b) injecting oxygen-containing gas towards the surface of the bath to form a secondary reaction zone in a section of the space above the bath through which oxidisable products released from the primary reaction zone flow to reach the waste gas outlet in the vessel and in which the oxidisable products are oxidised and the heat released by such oxidation is transferred into the bath.

It is understood that references herein to "a bath of molten metal" cover a bath containing molten metal and slag as well as a bath containing molten metal only.

The present invention is based partly on the realisation that a molten metal bath provides a suitable environment, both in terms of temperature and composition, for converting inorganic solid waste, particularly dusts, into more readily disposable components. The present invention is also based partly on the realisation that the use of a secondary reaction zone for oxidising any oxidisable products released from the molten metal bath provides a means of minimising the energy input to maintain the temperature of the molten metal bath.

It is preferred that the method further comprises injecting a gas into the bath to cause splashes and/or droplets of molten metal to be ejected upwardly from the bath into the secondary reaction zone or into a section of the space above the bath which is between the secondary reaction zone and the waste gas outlet to facilitate efficient heat transfer to the bath and scrubbing of volatilised species and any particulate material in the products released from the primary reaction zone and/or produced in the secondary reaction zone.

It can readily be appreciated that the combination of the oxidation of any oxidisable products in the secondary reaction zone and the scrubbing effect provided by the splashes and/or droplets of molten metal in the secondary reaction zone or downstream thereof provides a high level of assurance against unreacted or partially reacted inorganic solid waste short-circuiting treatment altogether and reporting in the exit gas stream from the vessel. This is achieved by providing at least two separate reaction zones through which unreacted or partially reacted inorganic waste must pass before exiting the vessel.

It is particularly preferred that the method further comprises injecting carbonaceous material into the bath to form a carburising zone in which the carbon in the carbonaceous material dissolves into the bath and is available for reaction with waste in the primary reaction zone.

The term carbonaceous material is herein understood to include: solid carbonaceous fuels such as coke and coal; liquid fuels such as oil, light fuel oil, diesel oil and heavy fuel oil; and gaseous fuels, such as natural gas, methane, ethane, propane, butane; or any mixtures of the fuels.

It is preferred that the carbonaceous material be selected from one or more of the group comprising coal, spent pot linings from aluminium smelting furnaces, and sewage sludge. It is particularly preferred that the carbonaceous material comprises coal.

In the above described embodiment the heat transferred to the bath from the secondary reaction zone contributes to balancing the heat loss from the bath as a consequence of endothermic reactions in the carburising and primary reaction zones.

One particularly preferred embodiment comprises locating the carburising zone directly below the secondary reaction zone.

It is preferred that the bath comprises at least 10% metal. It is particularly preferred that the bath comprises at least 70% metal. It is more particularly preferred that the bath comprises at least 80% metal.

It is preferred that the metal be selected from one or more from the group comprising iron, ferroalloys, nickel, tin, chromium, silicon, and copper, and mixtures thereof. It is particularly preferred that the metal comprises iron.

It is preferred that the gas injected into the bath to cause molten metal and slag splashes and/or droplets to be ejected upwardly into the secondary reaction zone be selected from one or more of an inert gas, recycled process gas, natural gas, $CO_2$, propane, or butane, or mixtures of the gases. It is particularly preferred that the inert gas be nitrogen.

It is preferred that the oxygen-containing gas be selected from the group comprising oxygen, air and steam. It is particularly preferred that the air be preheated. It is more particularly preferred that the air be preheated to temperatures in the range of 900° to 1600° C.

The present invention is described further with reference to the accompanying FIGURE which is a schematic illustration of a preferred embodiment of a method of treating inorganic solid waste in accordance with the present invention.

The preferred embodiment of the method of the present invention is described hereinafter in the context of treating dusts although it is understood that the present invention is not so restricted and extends to the treatment of solid inorganic waste generally.

The preferred embodiment of the method is carried out in a vessel generally identified by the numeral 3.

The vessel 3 may be of any suitable known design of metallurgical vessel with refractory lined internal walls and an outer metal shell. In the arrangement shown in the FIGURE the vessel 3 is a generally cylindrical shape disposed horizontally and has bottom tuyeres 5, 7, a slag/metal tap 9, an air injection port 10, and an upper off-gas outlet 11 at one end of the vessel 3. Typically, the ratio of the length and the diameter of the vessel is 3:1.

The vessel 3 contains a volume of molten metal which comprises at least 10% iron and a layer of slag at a temperature of 1400° C. The other metals in the bath may be selected as required and, by way of example, may comprise one or more of ferroalloys, tin, nickel, silicon and copper.

The preferred embodiment of the method comprises injecting dusts entrained in a suitable carrier, such as an inert gas, through the bottom tuyeres 5 into the bath to form a primary reaction zone indicated schematically by the line identified by the numeral 13 which is located at the end of the vessel 3 remote from the off-gas outlet 11. The dusts undergo a range of reactions and phase changes in the primary reaction zone 13 depending on the composition of the dusts. Typically, the metal oxides in the dusts are reduced and the metal values report into the bath or in some cases are volatilised. Other components of the dusts may be broken down or volatilised and released directly into the gas space above the bath.

The method also comprises injecting pre-heated air, typically at a temperature in the range of 900° to 1600° C., or any other suitable oxygen-containing gas through injection port 10 towards the surface of the bath adjacent the primary reaction zone 13 to form a secondary reaction zone indicated schematically by the line identified by the numeral 17 in the section of the space above the bath that is located between the section that is directly above the primary reaction zone 13 and the off-gas outlet 11.

The method also comprises simultaneously injecting nitrogen or my other suitable gas through tuyeres 7 into the bath immediately below the secondary reaction zone 17 to cause eruption of molten metal and slag in splashes and/or droplets from the surface of the bath into the secondary reaction zone 17. Typically, the nitrogen is injected in an amount greater than or equal to $0.1 \text{ Nm}^3 \text{ min}^{-1} \text{ tonne}^{-1}$ of molten metal in the bath.

In the secondary reaction zone 17 the pre-heated air oxidises any oxidisable products from the primary reaction zone 13. Furthermore, the heat released by such oxidation is efficiently transferred to the splashes and/or droplets of molten metal and slag and subsequently into the bath when the splashes and/or droplets fall downwardly to the surface of the bath. The splashes and/or droplets also scrub volatilised species and any particulate material from the primary reaction zone 13 and/or formed in the secondary reaction zone 17 and transfer the scrubbed values to the bath.

It is preferred that the carbonaceous material be selected from one or more of the group comprising coal, spent pot linings from aluminium smelting furnaces, and sewage sludge. It is particularly preferred that the carbonaceous material comprises coal.

It is noted that in effect the splashes and/or droplets of molten metal and slag form a curtain which is an effective and efficient means of transferring heat to the bath and scrubbing volatilised species and particulate material from products from the primary reaction zone 13 and/or secondary reaction zone 17.

Typically, the temperature in the secondary reaction zone 17 is controlled to be at least 200° C. higher than that of the molten metal. Typically, the temperature in the secondary reaction zone 13 varies between 1500° C. and 2700° C.

It can be readily appreciated from the foregoing that in the preferred embodiment of the method the secondary reaction zone 17 has three important functions. Specifically, the secondary reaction zone 17:

(a) oxidises any oxidisable products from the primary reaction zone 13;

(b) ensures that the heat released by such oxidation is transferred to the bath; and (c) scrubs any volatilised species and any particulate material from the primary reaction zone 13 and/or formed in the secondary reaction zone 17.

The preheated air may be injected into the secondary reaction zone 17 by any suitable means such as top-blowing single or multiple tuyeres or lances with one or more openings.

In many instances, the reduction of metal oxides in the dusts to metal values will be a dominant reaction in the primary reaction zone 13. As a consequence, in such situations, in order to maintain a level of carbon in the bath to reduce efficiently the metal oxides in the dusts, the method also comprises injecting carbonaceous material such as coal into the bath through tuyeres 7 to form a carburisation zone indicated schematically by the line identified by the numeral 15. The volatiles in the coal are thermally cracked and the carbon dissolves in the iron and disperses through the bath and in particular into the primary reaction zone 13.

It is noted that the heat transfer to the bath is important since reduction reactions in the primary reaction zone 13 and the carburisation zone 15 are essentially endothermic and it is important to balance the heat loss due to such reactions to maintain the temperature of the bath at an effective operating level.

It can be readily appreciated from the foregoing that the preferred embodiment of the method of the present invention is an efficient means by which solid inorganic waste, particularly dusts, can be converted into component parts which are non-hazardous and comparatively straightforward to recover.

In addition, it can be readily appreciated that the use of two separate reaction zones in the preferred embodiment provides a high level of assurance against unreacted dusts, which may include hazardous components, short-circuiting treatment altogether.

Many modifications may be made to the preferred embodiment of the method of the present invention without departing from the spirit and scope of the present invention.

In this regard, whilst in the preferred embodiment the inorganic solids and coal are injected into the bath to form separate, essentially macro-sized, reaction and carburisation zones in the bath, it can readily be appreciated that the present invention is not so limited and the injection of the constituents into the bath can be controlled to form arrays of separate essentially micro-sized primary reaction and carburisation zones.

Furthermore, whilst the preferred embodiment includes the location of the secondary reaction zone 17 immediately above the carburisation zone 15, it can readily be appreciated that the present invention is not so limited and the secondary reaction zone 17 may be located above a section of the bath that is adjacent to the carburisation zone 15.

Furthermore, whilst the preferred embodiment comprises injecting nitrogen or any other suitable gas into the bath to cause eruption of molten metal and slag splashes and droplets to form a curtain in the secondary reaction zone 17, it can readily be appreciated that the present invention is not so limited. By way of example, the curtain of splashes and droplets of molten metal and slag may be projected into a section of the bath which is between the secondary reaction zone 17 and the waste gas outlet 11 so that products, gaseous or solid, flowing from the secondary reaction zone 17 are required to pass through the curtain before reaching the waste gas outlet 11. As a consequence, the curtain enables heat transfer back to the bath and scrubbing of volatilised species and any particulate material flowing from the secondary reaction zone 17.

We claim:

1. A method of treating inorganic solid waste in a bath of molten metal in a vessel which has a bottom, top, space above the bath and a waste gas outlet, the method comprising:

(a) injecting said waste and a carbonaceous material into said bath to form a primary reaction zone in which there are reactions between the waste and the carbonaceous material in the bath;

(b) injecting oxygen-containing gas towards the surface of the bath to form a secondary reaction zone in a section of the space above the bath through which oxidizable products released from the primary reaction zone flow to reach the waste gas outlet, oxidizing the oxidizable products with the heat released by such oxidation is transferred into the bath; and (c) injecting a gas into the bath to cause splashes and/or droplets of molten metal to be ejected upwardly from the bath to form a curtain of splashes and/or droplets traversing the space between the surface of the bath and the top of the vessel, the curtain extending from the surface of the molten bath to the top of the vessel, the molten metal ejected upwardly into the secondary reaction zone or into a section of the space above the bath which is between the secondary reaction zone and the waste gas outlet to facilitate efficient heat transfer to the bath and scrubbing of particulate material in the products released from the primary reaction zone and/or formed in the secondary reaction zone.

2. The method defined in claim 1 further comprising injecting solid carbonaceous material into the bath to form a carburising zone in which the carbon in the carbonaceous material dissolves into the bath, said solid carbonaceous material being available for reaction with waste in the primary reaction zone.

3. The method defined in claim 2, wherein the carbonaceous material is selected from one or more of the group comprising coal, spent pot linings from aluminium smelting furnaces, and sewage sludge.

4. The method defined in claim 3, wherein the carbonaceous material comprises coal.

5. The method defined in claim 2, further comprising locating the carburising zone directly below the secondary reaction zone.

6. The method defined in claim 1, wherein the bath comprises at least 10% metal.

7. The method defined in claim 6, wherein the bath comprises at least 70% metal.

8. The method defined in claim 7, wherein the bath comprises at least 80% metal.

9. The method defined in claim 6, wherein the molten metal is selected from the group consisting of nickel, tin, chromium, silicon, copper, and mixtures thereof.

10. The method defined in claim 1, wherein the gas injected into the bath to cause molten metal and slag splashes and/or droplets to be ejected upwardly into the secondary reaction zone is selected from the group consisting of nitrogen, recycled process gas, natural gas, $CO_2$, propane, or butane, and mixtures thereof.

11. The method defined in claim 1, wherein the oxygen-containing gas is selected from the group comprising oxygen, and air.

12. The method defined in claim 11, further comprising the step of preheating the oxygen-containing gas.

13. The method defined in claim 12, wherein the oxygen-containing gas is preheated to temperatures in the range of 900° to 1600° C.

* * * * *